United States Patent [19]

Hawkes, Jr.

[11] Patent Number: 4,499,036
[45] Date of Patent: Feb. 12, 1985

[54] MICROWAVE CURING OF LATEX-BASED COMPOSITIONS

[75] Inventor: J. Barry Hawkes, Jr., Watertown, Mass.

[73] Assignee: W. R. Grace & Co., Cambridge, Mass.

[21] Appl. No.: 632,682

[22] Filed: Jul. 20, 1984

Related U.S. Application Data

[63] Continuation of Ser. No. 419,376, Sep. 20, 1982.

[51] Int. Cl.³ .............................................. B29H 5/26
[52] U.S. Cl. ..................... 264/26; 264/46.9; 264/54; 264/DIG. 5; 521/66; 521/69; 521/71; 521/72; 521/915
[58] Field of Search ............... 521/915, 66, 69, 71, 521/72; 264/26, 46.9, 54, DIG. 5

[56] References Cited

U.S. PATENT DOCUMENTS

| | | | |
|---|---|---|---|
| 3,737,399 | 6/1973 | Locke et al. | 521/91 |
| 3,737,488 | 6/1973 | Porter et al. | 521/91 |
| 4,391,765 | 7/1983 | Lee et al. | 521/915 |

Primary Examiner—Morton Foelak
Attorney, Agent, or Firm—John J. Wasatonic; William L. Baker

[57] ABSTRACT

A method of providing cured latex-based compositions is disclosed which permits in situ curing of latexes disposed in plastic container closures or other heat sensitive receptacles without adverse effect on the closure or receptacle. The method comprises heating a fluid latex composition to gel the latex and effect removal of at least a portion of the water initially contained therein and subjecting the resultant composition to modulated microwave energy to effect curing thereof. Modulation of the microwave energy is achieved by applying same in an intermittent or pulsed fashion. The method is of particular interest for the in situ formation of cured latex-based gaskets in polyalkylene container closures.

27 Claims, No Drawings

MICROWAVE CURING OF LATEX-BASED COMPOSITIONS

This is a continuation of co-pending application Ser. No. 419,376 filed Sept. 20, 1982.

BACKGROUND OF THE INVENTION

The present invention relates to a process of preparing cured latex-based compositions and, more particularly, relates to a process for in situ formation of cured latex gaskets in thermally deformable container closures.

It is common in the art of container closures to provide a gasket or "liner" about the periphery of the underside of the closure which functions to provide a tight seal between the closure and the upper rim of the closed container. The gasket is preferably of a resilient material which is capable of forming an air-tight seal with the container rim and which allows for resealing the closure after opening.

For the larger sized container closures e.g., those used for drums and 5 gallons pails, a latex gasket is often preferred, based on performance and cost factors. In general, latexes can be used to provide foamed gaskets having desired resiliency and inertness and, inasmuch as relatively large quantities of gasket material are required in such applications, latexes offer attractive economies as compared to other prospective gasket materials.

Gaskets have heretofore been incorporated into container closures either by insertion of a preformed gasket into the closure, generally involving insertion into a channel located about the periphery of the closure, or by introduction of a fluid latex into such a channel and in situ gelling, foaming and curing of the latex by application of sufficient heat. The former practice suffers from the disadvantage of requiring considerable expenditure for equipment and labor, both to preform the gasket and to insert same into the closure. The latter practice, while generally more satisfactory when used with metal closures, has proven unsatisfactory for use with plastic closures. More specifically, temperatures above 200° F. are required for curing the latex and at such temperatures plastic closures can undergo severe distortion rendering them completely unsuitable for their intended use. Since the use of plastic closures and containers has become widespread, it would be desirable to provide a means whereby latex gaskets could be formed in situ without causing the aforementioned distortion of the closure.

U.S. Pat. No. 4,304,744 to 1 relates to a method of forming a sealing gasket made from vinyl chloride resin plastisol in container closures made of a high-melting olefin polymer, especially polypropylene. As part of the method of the patent, the container closure is heated to a temperature from 5° C. to 35° C. below its melting point and, at this temperature, microwave heating is introduced to flux the plastisol. The conventional preheating of the closure is disclosed to permit complete fluxing of the plastisol by microwave heating as a result of minimization of heat loss from the plastisol during the microwave heating.

SUMMARY OF THE INVENTION

According to the present invention, a method has been discovered for providing cured latex-based compositions which can be used to effect in situ curing of latexes disposed in plastic closures or other heat sensitive receptacles without adverse effect on the closure or receptacle. The method of this invention comprises heating the latex composition to gel the latex and effect removal of at least a portion of the water initially contained therein and subjecting the resultant composition to microwave energy to effect curing thereof. The microwave energy which is applied to effect curing is modulated such that the composition undergoes uniform and complete curing without substantial blistering, charring, or other degradation.

In a preferred embodiment, the microwave radiation is applied in a pulsed fashion such that dissipation of the heat created thereby in the latex occurs between pulses, thus allowing the desired curing without blistering or degradation.

The present invention also relates to the use of the microwave curing process of this invention in the in situ formation of cured latex foam gaskets in plastic container closures, especially polypropylene closures. The microwave curing process provides high quality, uniformly cured gaskets having a uniform cellular structure and desired resiliency. Curing of the gaskets is accomplished without appreciable deformation or other adverse effect on the plastic closure.

DETAILED DESCRIPTION OF THE INVENTION

The microwave curing process of this invention provides a means whereby latex compositions deposited on or in substrates or receptacles which are adversely sensitive to latex curing temperatures can be formed into finished and cured compositions without adverse effect on the substrate or receptacle. The process is especially useful for the in situ curing of latex gasket compositions disposed on polyalkylene container closures, especially polypropylene. Accordingly, the process is described hereinafter primarily in terms of forming gaskets in such closures although it should be understood that the process can be applied generally for the formation of cured latex compositions and is not limited to the container closure art.

In forming gaskets according to the present process, the fluid latex is introduced onto the surface of the closure, most commonly into a channel provided about the periphery of the closure, and heated to effect gelling and foaming of the latex and, concomitantly, to remove at least a portion of the water initially contained therein. The resultant composition is then subjected to microwave energy to effect curing thereof, the microwave energy being modulated as necessary to effect a uniform and complete cure without blistering, charring, or other degradation. The present process has been found to be capable of providing gaskets which are uniformly and completely cured; which have a substantially uniform cellular structure; and which exhibit desired resiliency as necessary for proper sealing of containers. The complete and uniform curing of the gasket is achieved without significant deformation or other deleterious effect on the closure substrate, as further discussed below.

In its broad aspects, the present process depends on a differential in microwave absorption efficiency (loss factor) between the latex gasket composition and the polyalkylene closure. Microwave energy is absorbed in a relatively efficient manner by the latex composition, heating the composition to its curing temperature, but is not significantly absorbed by the closure, polyalkylenes being relatively poor absorbers of microwaves, such that the closure remains at a temperature below that at which deformation can occur.

In general, latex gaskets possess a foamed or cellular structure which contributes to their resiliency and sealing capabilities. For purposes of reproducibility, process control, and optimal performance, a substantially uniform cellular structure is preferred. In the context of the present process, it has been found that the presence of substantial quantities of water during the microwave curing step has a deleterious effect on the cell structure of the finished gasket, arising apparently from rapid volatilization of the water upon application of microwave energy. Accordingly, it is provided that at least a portion of the water in the fluid latex is removed by heating prior to the curing step such that the desired uniform cellular structure can be attained.

The amount of water to be removed, as a percentage of the total amount originally present, can vary depending on the nature of the latex composition and the cellular structure which is desired. Generally, at least a major proportion of the water is removed and, preferably, substantially all of the water is removed. Removal of substantially all of the water provides optimal process control and avoids criticality in the time, temperature, drying conditions, etc. which would attach to removal of a specified lesser amount.

The water is removed by evaporation occuring during and after the gelling and foaming reactions.

To effect the gelling, foaming, and evaporative processes, the latex is heated to a temperature of at least about 150° F., preferably to a temperature in the range of about 160° F. to 180° F. Temperatures within the preferred range provide especially satisfactory gelling and foaming of the latex and normally effect removal of substantially all of the water in a typical high solids latex (70% to 85% solids) in about 15 to 30 minutes, although suitable times can vary depending on, e.g., thickness of the latex bead, oven drying conditions, or the composition of the latex. The temperature should not exceed that at which deformation of the closure occurs. Suitable temperatures will vary with the particular polymeric closure material and with the shape and integrity of the closure. Deformation of plastic container closures is believed to occur as a result of stress relief, i.e., relief of mechanical stresses induced in the plastic during molding of the closure. For molded polypropylene, which is the most common closure material, stress relief can begin to occur at temperatures above 160° F. and can be a severe problem at temperatures above 180° F. However, in conducting the present process using molded polypropylene closures, it has proven feasible to employ temperatures in the preferred range of about 160° F.–180° F. for lengths of time effective to complete the gelling, foaming, and evaporative processes, usually about 20 to 30 minutes, without appreciable deformation of the closure.

After the latex has been gelled and foamed and the desired amount of water has been removed, the resultant composition is cured by application of microwave radiation. The curing may be conducted immediately after completion of the above or it may be conducted at a later point in time, most preferably within 1 hour after completion of gelling and foaming. The temperature of the closure is not critical to the curing of the latex such that the closure and gelled gasket may be allowed to cool prior to curing and need not be reheated prior to the application of microwave energy.

During curing, the input of microwave energy is modulated in order to provide a uniform and complete cure of the composition. Notwithstanding that a portion or substantially all of the water has been removed prior to curing, it has been found that without proper control of microwave input the composition can undergo severe charring and blistering, especially in its interior portions. Modulation of microwave input is thus employed to permit dissipation of heat from the center of the composition outward and thereby effect uniform curing.

Modulation of microwave input is accomplished by applying the microwave energy in an intermittent or pulsed fashion. This method decreases the criticality of the intensity of the radiation and generally provides a flexible and readily controlled means of effecting curing. The duration and frequency (interval) of the pulses can be varied over a wide range, as appropriate for a particular composition or gasket thickness. In most applications, the pulses will have a duration in the range of about 5 to 40 seconds, 10 to 30 seconds and be applied at intervals also within the range of about 5 to 40 seconds, preferably at intervals of at least 10 seconds. The preferred practice is to provide pulses of equal duration at equally spaced intervals, usually with the pulse duration being equal to the interval time. The total time of microwave application is generally in the range of about 1 to 5 minutes. Normally, utilizing standard microwave sources providing about 0.5 to 2.0 kw. output, complete curing can be accomplished by, say, 5 to 10 pulses of about 10 seconds to 30 seconds duration provided at equally spaced intervals of about 10 to 30 seconds. The particular or preferred mode of microwave pulsing can be empirically determined and may depend on such factors as gasket thickness, the loss factor of the composition, and process variables such as oven size and the number and arrangement of the closures in the oven.

Any vulcanizable rubber latex composition may be employed in the practice of this invention. Examples are polybutadiene, polyisoprene, neoprene, and preferably, styrene-butadiene rubber latexes. Natural rubber can also be used either alone or admixed with synthetic rubbers such as those mentioned above. The latexes may contain any of the additives known in the art such as gelling agents, gel sensitizers, surfactants, cross-linking agents, accelerators, fillers, thickeners, pigments, plasticizers, etc. The preparation of rubber latexes which can be gelled, foamed, and cured is well known to the art and, in general, the various ingredients and additives heretofore employed to provide desired compositions and desired properties can be similarly employed in the present invention. Typical latex rubber compositions which can be used herein may contain the following ingredients, quantified in terms of parts per hundred rubber (phr):

| Ingredient | phr |
| --- | --- |
| Rubber solids | 100 |
| Filler | 100–300 |
| Anionic surfactant | 1–10 |
| Non-ionic surfactant | 0.5–3 |
| Emulsified wax | 3–10 |
| Oil plasticizer | 40–100 |
| Thickener | 0–10 |
| Gelling agent | 1–10 |
| Accelerators | 0.5–3 |

-continued

| Ingredient | phr |
|---|---|
| Antioxidant | 0.5–5 |

In general, latex compositions having a total solids content of about 70% to 85% are preferred.

For curing and foaming such compositions, a separate anhydrous additive composition can be prepared containing a curing agent, usually sulfur, and a blowing agent and added shortly before commencing gelling of the latex. The additive may typically contain the following ingredients, quantified in terms of weight percent of the additive:

| Ingredient | Weight percent |
|---|---|
| Mineral oil | 50–60 |
| Sulfur | 20–35 |
| Water scavenger | 0.5–3 |
| Pigment | 2–5 |
| Accelerators | 5–15 |
| Blowing agent | 3–10 |
| Dispersant | 0.1–1 |

The amount of the additive which is admixed with the latex composition will vary depending on the particular formulations and typically is in the range of 1 part by weight of additive to about 20 to 100 parts of latex composition.

As indicated above, for preparation of foamed compositions a chemical blowing agent is compounded with the latex. Preferred blowing agents are those yielding nitrogen and capable of functioning within the latex at temperatures below about 170° F., e.g., benzenesulfonyl hydrazides, such as 4,4'-oxybis (benzenesulfonyl hydrazide), and N-nitroso compounds such as N,N'-dinitroso pentamethylenetetramine.

As indicated above, the present process is of particular interest for the production of foamed latex gaskets and, consistent with this use, the blowing agent is included in the fluid latex used for gasket formation. However, the present invention is not limited to the production of foamed latex compositions but is generally applicable to the production of cured non-cellular latexes as well. Accordingly, the blowing agent may be omitted from the fluid latex in order to facilitate production of a non-cellular product.

It should be recognized that the rate of curing of the latex is a function of the combined microwave absorption efficiency of the individual components of the gelled and at least partially dried composition. The particulate rubber component of the latex is normally not an efficient microwave absorber and, as previously noted, water is removed from the composition, preferably completely, in order to avoid the effects of its absorption of microwaves. As a result, microwave absorption by the composition primarily derives from the combined absorption of the various additives present therein. Preferred additives from this standpoint are those which are efficient microwave absorbers. For example, certain oils used to plasticize the composition, such as naphthenic oils, have been found to also provide desired levels of microwave absorption. It is within the present invention to include additives in the latex compositions primarily or solely for the purpose of providing a desired degree of microwave absorption.

Heat sensitive gelling agents are normally used in the latex compositions employed herein. These gelling agents and their method of use are well known in the latex art and any suitable gelling agent can be used in the present invention. Particularly well known heat sensitive gelling agents are those derived from zinc oxide in combination with an ammonium salt, e.g., ammonium acetate.

A preferred amount of gelling agent is that which is sufficient to provide required gelation in about 15 to 30 minutes at the preferred temperature range of 160° F. to 180° F. Normally, gelation at the desired rate can be accomplished with amounts in the range of about 3 to 8 phr of gelling agent.

The microwave frequency employed to cure the composition is not critical. In principle, any frequency in the range of about 300 to 300,000 mc/s may be used. However, the commonly used frequency of about 2450 mc/s is most conveniently employed and provides particularly satisfactory results. Source power as low as 100 watts or less may be used but normally the power is considerably higher, e.g. at least about 0.5 kw. and as high as about 6.0 kw.

In a typical manner of conducting the process of this invention, the fluid latex is flowed into a channel at the periphery of the container closure by rotating the closure beneath a stationary nozzle or series of nozzles from which the latex is dispensed. The closure containing the fluid latex is then transported, e.g., on a conveyor belt, into a conventional preheated hot air oven. The oven may be equipped with blowers or other drying means to facilitate water removal from the latex. Immediately after gelling, foaming, and water removal, the closure can be exposed to microwave radiation to effect curing or the curing step can be carried out at a later point in time. Normally, the closure is removed from the conventional oven and placed in a separate microwave oven, although it is within the present invention to employ an oven having combined conventional and microwave heating capabilities. When placed in the microwave oven the closures may be stacked or otherwise arranged without adverse effect on the curing process. However, where a multiplicity of closures are cured simultaneously, it is generally necessary to increase the microwave input in order to obtain complete curing of all gaskets, e.g., by providing more or longer pulses of radiation.

The present invention is particularly applicable to closures made of polypropylene. However, the invention is also applicable to other polyalkylenes, including polyethylenes and polyalkylene copolymers prepared utilizing propylene monomer, and broadly contemplates the use of any plastic or polymeric substrate which is relatively transparent to microwaves, and particularly those adversely effected by latex curing temperatures.

For adequate and reliable sealing of containers with the larger-sized container closures, it is preferred to employ gaskets having a thickness or diameter of at least ⅛ inch. Trial and error can be used to determine the specific quantity of fluid latex necessary to provide a gasket having desired dimensions. The latex normally undergoes expansion in situ during the foaming process. This not only provides increased dimension to the finished gasket for sealing purposes but also provides an advantageously tight fit of the gasket in the channel. Accordingly, while a substantial degree of adhesion is normally not developed between the closure and the gasket, the gasket is nonetheless tightly retained in the channel and is not readily removed. However, where desired, undercuts or other configurational variations of the channel walls or bottom may be employed to further ensure retention of the gasket in the closure.

Consistent with the dimensional thicknesses of the preferred latex foam gaskets, the present invention is especially well suited for the production of relatively thick products, e.g., having a thickness or diameter of at least $\frac{1}{8}$ inch. As opposed to relatively thin films and coatings, these thicker products have a proportionately large interior volume, such that heat build up in interior portions upon application of microwave radiation is of greater concern.

The present invention is further described by way of the following examples, wherein specific quantities and procedures are intended as illustrative and not limitative.

EXAMPLE 1

A latex composition was prepared containing the following ingredients:

| Ingredients | phr (solids) |
| --- | --- |
| Styrene-butadiene rubber latex | 100.0 |
| Filler | 215.8 |
| Anionic surfactant | 2.8 |
| Non-ionic surfactant | 0.8 |
| Emulsified paraffin wax | 6.2 |
| Emulsified naphthenic oil | 63.1 |
| Polymeric thickner | 0.9 |
| Gelling agent | 6.0 |
| Accelerator | 1.9 |

The latex composition contained 83% total solids. To 454.0 parts of the latex composition were added 10.2 parts of an additive composition containing the following ingredients:

| Ingredients | % by weight |
| --- | --- |
| Mineral oil | 53.5 |
| Sulfur | 27.5 |
| Water scavenger | 0.7 |
| Pigment | 2.3 |
| Accelerators | 9.4 |
| Blowing agent | 5.6 |
| Dispersing aid | 0.3 |

The resultant latex composition was dispensed into an approximately $\frac{3}{4}$ inch deep and $\frac{1}{4}$ inch wide channel located about the periphery of a 12 inch diameter circular container closure made of molded polypropylene. About 20 grams of the latex were dispensed into the channel from a stationary nozzle positioned above the rotating closure.

The fluid latex bead had a thickness or depth in the channel of about $\frac{1}{8}$ inch.

The container closure was then heated in a recirculating hot air oven to 160° F. and maintained at that temperature for about 20 minutes. The closure was then removed from the hot air oven and placed in a Raytheon Mark V microwave oven. An undetermined degree of cooling of the closure occurred prior to placement in the microwave oven. The microwave oven was operated at low power (about 0.8 kw.) and was cycled on and off at 10 second intervals, i.e., 10 seconds on and 10 seconds off. The total on time was about 1 minute.

The resultant gasket in the closure was dry and uniformly cured throughout. The gasket displayed good elasticity and possessed a highly uniform cell structure. When placed in toluene for about 20 minutes a 2 inch segment of the gasket underwent relatively minimal swelling, to about $3\frac{1}{4}$ inches, evidencing substantially complete cure. No appreciable deformation of the closure was observed.

Curing of the latex composition described in the above example was also successfully accomplished employing on-off cycles or pulsing of the microwave radiation of 15 seconds on—15 seconds off and 30 seconds on—30 seconds off for total on times of between 1 to 4 minutes.

EXAMPLE 2

A latex composition was identically prepared as in Example 1 and 18 grams were dispensed into the channel of a similarly configured polypropylene container closure. The fluid latex bead had a thickness or depth in the channel of about $\frac{1}{8}$ inch. The closure was heated in a recirculating hot air oven to 180° F. and maintained at that temperature for about 20 minutes. The closure was then removed from the hot air oven and placed in the Raytheon Mark V microwave oven. As in Example 1, an undetermined degree of cooling of the closure occurred prior to placement in the oven. The microwave oven was operated at about 0.8 kw. power and was cycled on and off at 15 second intervals, i.e., 15 seconds on and 15 seconds off. The total on time was about 1.5 minutes. The resultant cured gasket had an appearance and properties substantially identical to those of the gasket obtained in Example 1. No appreciable deformation of the closure was observed.

For comparison purposes, the same container closure and deposited amount of latex composition were subjected to a conventional gelling, foaming, and curing treatment. Thus, the closure was heated in a conventional hot air oven for 15 minutes at 200° F. and then for 15 additional minutes at 250° F. to effect curing. The resultant cured gasket had a similar appearance and similar properties to that obtained by the microwave curing process of this example. However, the container closure was observed to have undergone a substantial degree of distortion.

What is claimed is:

1. A process of forming a cured latex-based foam composition comprising the steps of heating a fluid rubber latex containing a gelling agent, a curing agent and a blowing agent to effect gelling and foaming thereof and removal of a major proportion of the water initially contained therein and subjecting the resultant gelled and foamed composition to microwave radiation to effect curing thereof, said microwave radiation being modulated to provide substantially uniform and complete curing of said gelled and foamed composition.

2. A process of claim 1 wherein said microwave energy is modulated by being applied in a pulsed fashion.

3. A process of claim 2 wherein the pulses of microwave radiation are about 5 to 40 seconds in duration and are applied at equally spaced intervals ranging from about 5 to 40 seconds.

4. A process of claim 3 wherein the pulses are of equal duration and are applied at equally spaced intervals.

5. A process of claim 4 wherein the pulse duration and interval time are equal and are at least 10 seconds.

6. A process of claim 1 wherein said fluid latex is heated to a temperature of at least 150° F.

7. A process of claim 6 wherein said fluid latex is heated to a temperature in the range of about 160° F. to 180° F. for about 15 to 30 minutes.

8. A process of claim 1 wherein a sufficient amount of said water is removed to permit a substantially uniform cellular structure to be formed in said foam composition.

9. A process of claim 8 wherein said water is completely removed.

10. A process of claim 1 wherein said fluid latex is deposited on a polyalkylene substrate.

11. A process of claim 1 wherein said fluid latex is a styrene-butadiene rubber latex.

12. A process of claim 1 wherein said fluid latex comprises a naphthenic oil.

13. A process of claim 1 wherein said foam composition possesses a thickness or diameter of at least ⅛ inch.

14. A process of forming a cured rubber latex-based gasket in a container closure comprising the steps of applying a fluid rubber latex composition containing a gelling agent, a curing agent and a blowing agent about the periphery of said closure, heating said closure and latex composition to effect gelling and foaming thereof and removal of a major proportion of the water initially contained therein, and subjecting the resultant gelled and foamed composition to microwave radiation to effect curing thereof, said microwave radiation being modulated to provide substantially uniform and complete curing of said gelled and foamed composition.

15. A process of claim 14 wherein said microwave energy is modulated by being applied in a pulsed fashion.

16. A process of claim 15 wherein the pulses of microwave radiation are about 5 to 40 seconds in duration and are applied at equally spaced intervals ranging from about 5 to 40 seconds.

17. A process of claim 16 wherein the pulses are of equal duration and are applied at equally spaced intervals.

18. A process of claim 17 wherein the pulse duration and interval time are equal and are at least 10 seconds.

19. A process of claim 14 wherein said fluid latex is heated to a temperature of at least 150° F.

20. A process of claim 19 wherein said fluid latex is heated to a temperature in the range of about 160° F. to 180° F. for about 15 to 30 minutes.

21. A process of claim 14 wherein a sufficient amount of said water is removed to permit a substantially uniform cellular structure to be formed in said gasket.

22. A process of claim 21 wherein said water is completely removed.

23. A process of claim 14 wherein said closure is comprised of a molded polyalkylene polymer.

24. A process of claim 23 wherein said polyalkylene polymer is polypropylene.

25. A process of claim 14 wherein said fluid latex is a styrene-butadiene rubber latex.

26. A process of claim 14 wherein said fluid latex comprises a naphthenic oil.

27. A process of claim 14 wherein said gasket possesses a thickness or diameter of at least ⅛ inch.

* * * * *